UNITED STATES PATENT OFFICE.

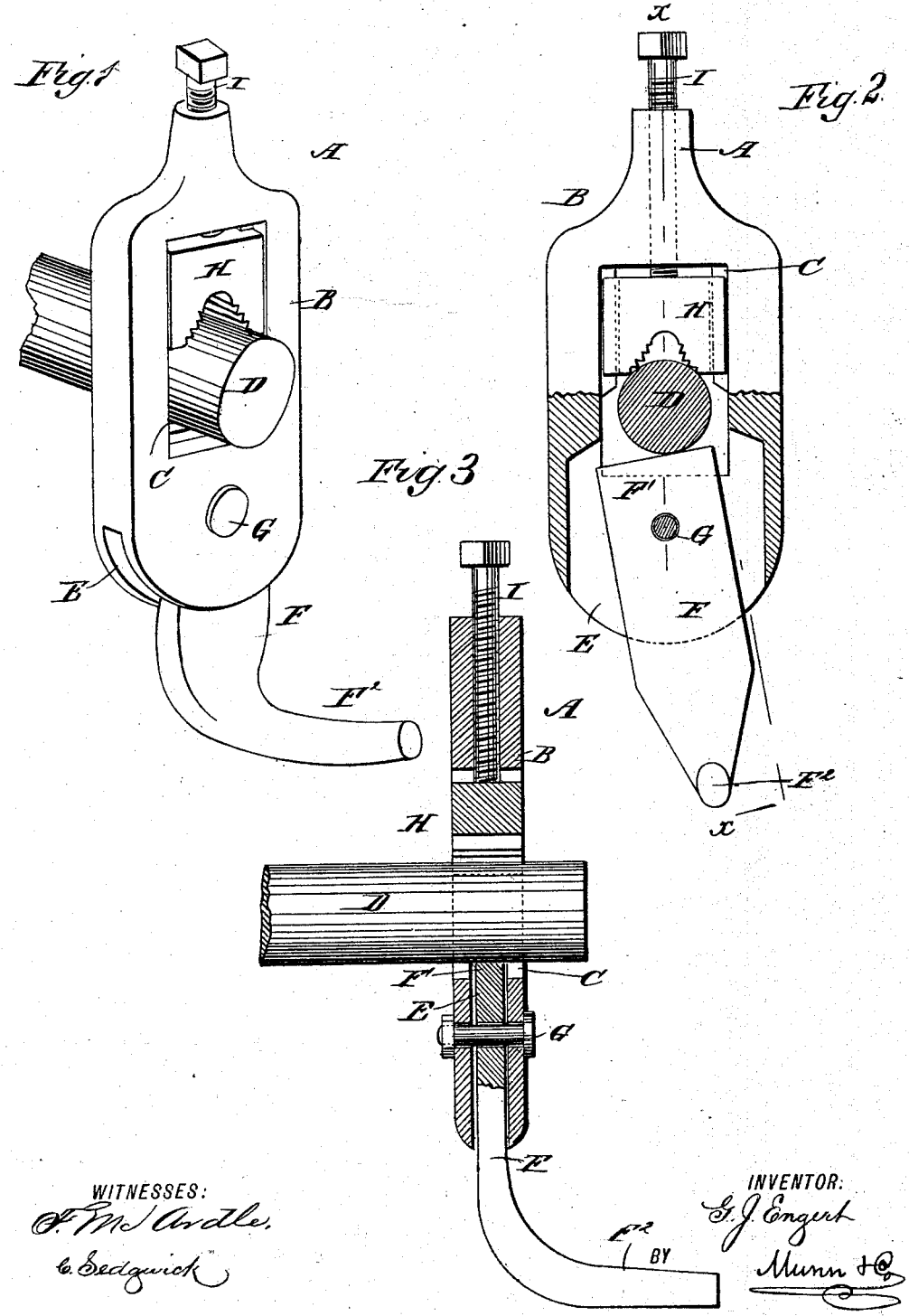

GEORGE JOHN ENGERT, OF DANSVILLE, NEW YORK, ASSIGNOR TO HIMSELF AND EDWARD C. SCHWINGEL, OF SAME PLACE.

LATHE-DOG.

SPECIFICATION forming part of Letters Patent No. 413,392, dated October 22, 1889.

Application filed July 25, 1889. Serial No. 318,621. (No model.)

*To all whom it may concern:*

Be it known that I, GEORGE JOHN ENGERT, of Dansville, in the county of Livingston and State of New York, have invented a new and Improved Lathe-Dog, of which the following is a full, clear, and exact description.

The object of the invention is to provide a new and improved lathe-dog which is simple and durable in construction, very effective in operation, requiring no wrench or other tool for adjusting it in starting or stopping, and which is self-tightening when the lathe is started.

The invention consists of a dog-body having an aperture for receiving the work and a tail or elbow pivoted in the said body and adapted to engage the work.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a perspective view of the improvement. Fig. 2 is a face view of the same, with parts in section; and Fig. 3 is a sectional side elevation of the same on the line $x\ x$ of Fig. 2.

The improved lathe-dog A is provided with a body B, having an aperture C, into which the work D is passed, as is plainly shown in the drawings. A slot E is formed in the dog-body B, and leads from one end to the aperture C, as is plainly shown in Fig. 2. Into the aperture C extends the tail F, which is pivoted therein by a bolt G in such a manner that the tail can freely swing in the said slot, and at the same time one of its ends F' extends into the aperture C. The tail F is also provided at its outer end with the usual offset $F^2$, adapted to engage the face-plate of the lathe. The work D thus rests with one end on the inner edge of the end F' of the tail F, as is plainly shown in the drawings, the opposite part of the work being engaged, preferably, by a die H, mounted to slide in suitable guideways in the aperture C and pressed against the work by a set-screw I, screwing in the body B of the lathe-dog A. The outer edge of the end F' of the tail F may be serrated, so as to firmly grip the work D.

The lathe-dog is used as follows: The work is passed into the aperture C, so that it rests on the inner edge of the end F' of the tail F, and then the set-screw I is adjusted by hand, so that the die H is pressed against the work D, opposite the end F' of the tail. The latter is then in a normal position, and when the dog A with the work is placed in position in the lathe the end $F^2$ engages the face-plate, and when the lathe is started the face-plate presses against the end $F^2$ of the tail F, and as the latter is pivoted in the body B it swings to one side, as is plainly shown in Fig. 2, thus pressing against the work D, and consequently tightening the latter on the die H. When the lathe is stopped, the tail F assumes its natural position, thus releasing the tight grip on the work D.

It is understood that when the lathe is started and the tail F swings, the inner edge is inclined, as is plainly shown in Fig. 2, so that the work D is firmly gripped and clamped between the said edge and the die H.

In the lathe-dogs heretofore used the set-screw I had to be adjusted by a wrench or other tool, so as to press the die H firmly in position on the work D, to prevent the latter from turning in the dog.

It will further be seen that the harder the face-plate turns the harder the tail F will be pressed in contact with the work D, so that the latter is clamped so much tighter in the dog.

It is understood that other suitable means instead of the die H may be used to engage the work D opposite the tail F—for instance, a set-screw only or a wedge may be used.

Having thus fully described my invention, I claim as new and desire to secure by Letters Patent—

1. A lathe-dog comprising a body part having an aperture adapted to receive the work, and a tail or elbow pivoted on the said body and adapted to engage the work, substantially as herein shown and described.

2. A lathe-dog comprising a body part having an aperture adapted to receive the work, a tail or elbow pivoted on the said body and adapted to engage the work, and a set-screw and die adapted to engage the work opposite the said tail, substantially as shown and described.

3. In a lathe-dog, the combination, with the body part having an aperture and a slot, of a tail pivoted in the said body part and extending through the said slot into the said aperture to engage the work, a die held to slide in the said aperture, and a set-screw for adjusting the said die, substantially as shown and described.

GEORGE JOHN ENGERT.

Witnesses:
FRED. W. NOYES,
OWEN A. ROWE.